(12) United States Patent
Chen et al.

(10) Patent No.: US 7,130,276 B2
(45) Date of Patent: Oct. 31, 2006

(54) HYBRID TIME DIVISION MULTIPLEXING AND DATA TRANSPORT

(75) Inventors: David Chen, Santa Rosa, CA (US); Frank Marrone, Cloverdale, CA (US); Mats Lund, Novato, CA (US)

(73) Assignee: Turin Networks, Petaluma, CA (US)

( * ) Notice: Subject to any disclaimer, the term of this patent is extended or adjusted under 35 U.S.C. 154(b) by 0 days.

(21) Appl. No.: 09/872,146

(22) Filed: May 31, 2001

(65) Prior Publication Data

US 2002/0191620 A1 Dec. 19, 2002

(51) Int. Cl.
*H04L 12/28* (2006.01)
*H04L 12/45* (2006.01)
*H04L 12/64* (2006.01)
*H04L 12/66* (2006.01)

(52) U.S. Cl. .................. 370/249; 370/352; 370/395.6; 370/401

(58) Field of Classification Search ................ 370/389, 370/394, 391, 395.1, 395.4, 395.5, 352, 353, 370/395.6, 401, 465, 466, 467, 249
See application file for complete search history.

(56) References Cited

U.S. PATENT DOCUMENTS

| | | | |
|---|---|---|---|
| 5,151,896 A * | 9/1992 | Bowman et al. ............. 370/401 |
| 5,345,445 A * | 9/1994 | Hiller et al. ................. 370/358 |
| 5,490,252 A * | 2/1996 | Macera et al. .............. 370/402 |
| 5,533,018 A * | 7/1996 | DeJager et al. ........... 370/395.5 |
| 5,541,921 A * | 7/1996 | Swenson et al. ............ 370/376 |
| 5,719,858 A * | 2/1998 | Moore ........................ 370/347 |
| 5,889,773 A * | 3/1999 | Stevenson, III ............. 370/352 |
| 5,894,477 A * | 4/1999 | Brueckheimer et al. .... 370/353 |
| 5,953,329 A * | 9/1999 | Degges et al. .............. 370/351 |
| 5,991,840 A * | 11/1999 | Suzuki ....................... 710/300 |
| 6,018,529 A * | 1/2000 | Toth ............................ 370/463 |
| 6,226,287 B1 * | 5/2001 | Brady ......................... 370/352 |
| 6,240,087 B1 * | 5/2001 | Cummings et al. ......... 370/353 |
| 6,259,699 B1 * | 7/2001 | Opalka et al. .............. 370/389 |
| 6,266,341 B1 * | 7/2001 | Surprenant et al. ......... 370/353 |
| 6,332,198 B1 * | 12/2001 | Simons et al. .............. 370/217 |
| 6,363,079 B1 * | 3/2002 | Barzegar et al. ............ 370/254 |
| 6,407,997 B1 * | 6/2002 | DeNap et al. .............. 370/352 |
| 6,650,649 B1 * | 11/2003 | Muhammad et al. ....... 370/402 |
| 6,674,750 B1 * | 1/2004 | Castellano .................. 370/354 |
| 6,683,887 B1 * | 1/2004 | Huang et al. ................ 370/466 |
| 6,854,015 B1 * | 2/2005 | McCormack et al. ....... 709/227 |
| 2002/0001301 A1 * | 1/2002 | Sarkissian et al ........... 370/352 |

* cited by examiner

*Primary Examiner*—Alpus H. Hsu
(74) *Attorney, Agent, or Firm*—Blakely, Sokoloff, Taylor & Zafman LLP

(57) ABSTRACT

A network switch includes multiple interface cards and a backplane that interconnects the interface cards. The interface cards receive network traffic and perform time and line switching on the data. The network traffic can include a combination of time division multiplexed (TDM) data and network data (e.g., ATM cells, IP packets). In one embodiment, the channels that carry network traffic to the interface cards are pre-configured as either TDM channels or network channels. The channels are processed as appropriate for their respective types by the interface cards. Because both TDM and network traffic can be processed by a single interface card, the number of cards within the network switch can be reduced.

34 Claims, 11 Drawing Sheets

HYBRID TIME DIVISION MULTIPLEXING AND DATA TRANSPORT

FIELD OF THE INVENTION

The invention relates to network switches. More particularly, the invention relates to transport of both time division multiplexed (TDM) traffic and network protocol (e.g., ATM, IP) traffic.

BACKGROUND OF THE INVENTION

In high bandwidth networks such as fiber optic networks, lower bandwidth services such as voice communications are aggregated and carried over a single fiber optic link. However, because the aggregated data can have different destinations some mechanism for switching the aggregated components is required. Switching can be performed at different levels of aggregation.

Current switching is accomplished in a synchronous manner. Signals are routed to a cross-connect or similar switching device that switch and route signals at some predetermined granularity level, for example, byte by byte. Synchronous switching in a cross-connect is a logically straight forward method for switching. However, because data flow between network nodes is not necessarily consistent, switching bandwidth may not be used optimally in a synchronous cross-connect. One source of data may use all available bandwidth while a second source of data may transmit data sporadically.

In order to support data sources that transmit at or near peak bandwidth, cross-connects are designed to provide the peak bandwidth to all data sources because specific data rates of specific data sources are not known when the cross-connect is designed. As a result, all data paths through the cross-connect provide the peak bandwidth, which may not be consumed by some or even most of the data sources.

A further disadvantage of synchronous switching architectures is that centralized switching control and interconnections grow exponentially as the input/output paths grow. Therefore, large switching architectures are complex and require complex control algorithms and techniques.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for transporting of both time division multiplexed (TDM) traffic and network protocol traffic are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In one embodiment, a network switch includes multiple interface cards and a backplane that interconnects the interface cards. The interface cards receive network traffic and perform time and line switching on the data. The network traffic can include a combination of time division multiplexed (TDM) data and network data (e.g., ATM cells, IP packets). In one embodiment, the channels that carry network traffic to the interface cards are pre-configured as either TDM channels or network channels. The channels are processed as appropriate for their respective types by the interface cards. Because both TDM and network traffic can be processed by a single interface card, the number of cards within the network switch can be reduced.

Figure 1:
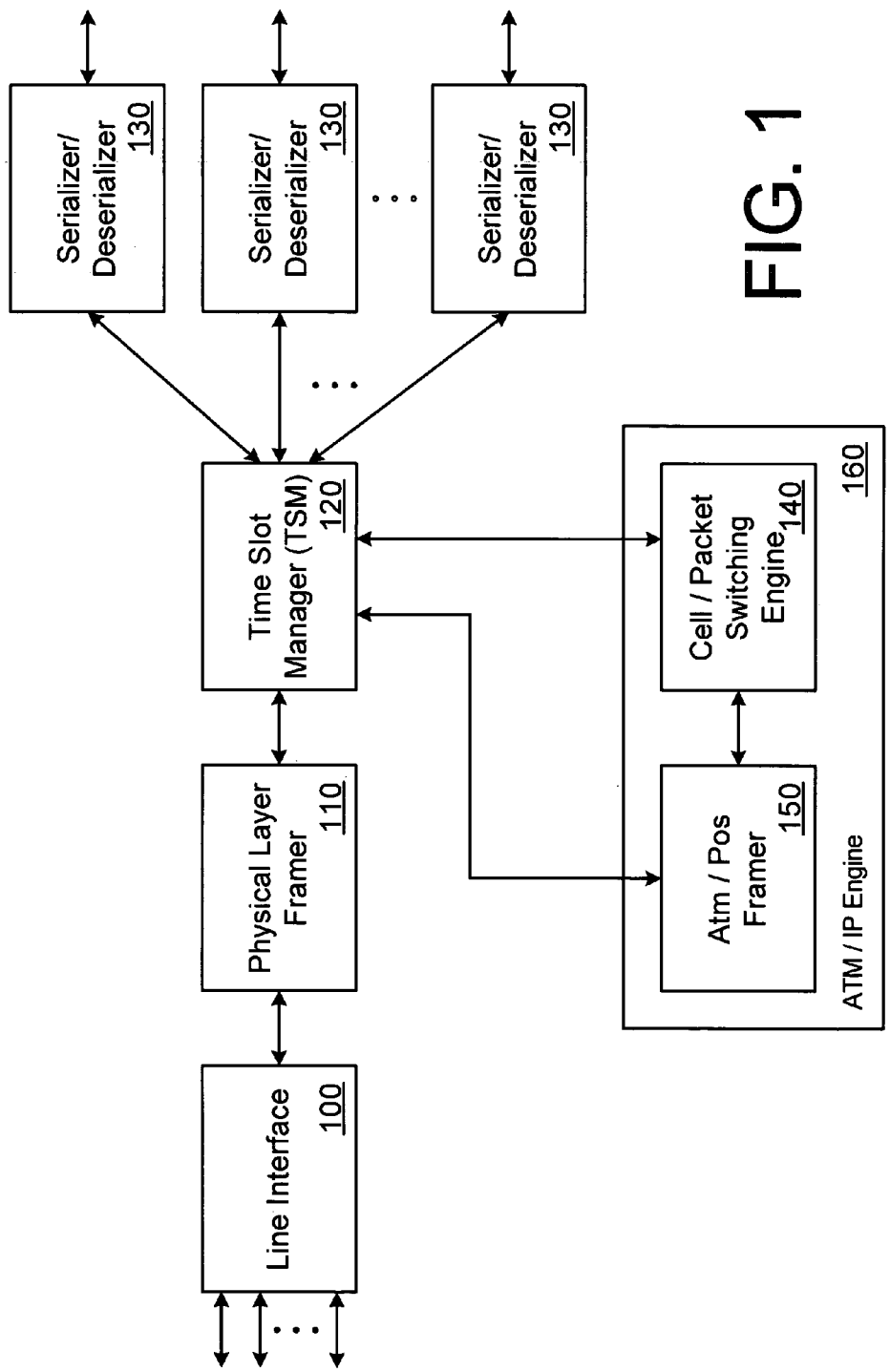
FIG. 1 is a block diagram of one embodiment of a line card for use in transporting TDM traffic and data traffic.

FIG. 1 is a block diagram of one embodiment of a line card for use in transporting TDM traffic and data traffic. The line card of FIG. 1 is coupled between a telecommunications line (e.g., optical fiber) and a backplane or switching fabric of a network switch. For reasons of simplicity neither the telecommunications line nor the backplane are illustrated in FIG. 1. The telecommunications line can be any type of telecommunications line known in the art. The backplane can be a type of backplane known in the art or a backplane specifically designed to operate with the line cards described herein.

Line interface 100 is coupled to telecommunications or other network lines. Line interface 100 can be, for example, an optical fiber interface that includes optical to electrical conversion circuitry to generate electrical signals that represent optical data received via the optical fiber(s). Line interface 100 can be coupled to one or more lines. Line interface 100 can also be coupled to receive electrical signals.

Physical layer framer 110 receives the electrical signals output by line interface 100 and generates frames of data. Physical layer framer 110 organizes the data received through line interface 100 into frames having predetermined formats so that the data can be processed by the components of the card as well as other cards of the network switch (not shown in FIG. 1).

For example, physical layer framer 110 can convert data between Synchronous Optical Network (SONET) frames and an internal cell format that is used by the components of the card of FIG. 1. The SONET standard is described in the American National Standards Institute (ANSI) standards T1.105 and T1.106 and in the Bellcore Technical Recommendations TR-TSY-000253. Other conversions can also be supported. Examples of conversions to an internal cell format are described in greater detail below.

Time Slot Manager (TSM) 120 receives and transmits frames of data from and to physical layer framer 110 and routes the data between physical layer framer 110 the appropriate serializer/deserializer (SERDES). TSM 120 also schedules the transmission of data based on, for example, data type, available bandwidth and/or other considerations. Data scheduling is described in greater detail in U.S. patent application Ser. No. 09/872,125, filed May 31, 2001, and entitled "DISTRIBUTED CONTROL OF DATA FLOW TN A NETWORK SWITCH," which is assigned to the corporate assignee of the present U.S. patent application and incorporated by reference herein.

TSM 120 sends data to one of a group serializer/deserializers for switching of data. TSM 120 can send data to multiple serializer/deserializers to multicast or broadcast data to multiple sources. In most situations, serializer/deserializers (e.g., 130, 132, 134) transmit data across a backplane, or switching fabric, to another card (not shown in FIG. 1) within the network switch. Alternatively, as described in greater detail below a serializer/deserializer can loop the data back to the card from which the data is sent. The serializer/deserializers also receive data from the backplane.

Asynchronous Transfer Mode/Internet Protocol (ATM/IP) engine 160 is coupled to TSM 120 and includes cell/packet switching engine 140 and ATM/POS framer 150. ATM/IP engine 160 is used for processing of ATM or IP data only. TDM data, for example, is scheduled and processed by TSM 120. In one embodiment, ATM/IP engine 160 resides on a daughter card that can be coupled with an interface to TSM 120. By having ATM/IP engine 160 on a daughter card, basic cards can be manufactured and ATM/IP functionality can be added to the card by coupling the ATM/IP engine daughter card to the main card. Alternatively, ATM/IP engine 160 can also be an integrated component of the line interface card of FIG. 1.

Cell/packet switching engine 140 provides switching at the cell/packet level. Data received from TSM 120 is switched as necessary and sent to ATM/POS framer 150 for framing in the appropriate format. The framed data is sent from ATM/POS framer 150 to TSM 120 for routing to the appropriate serializer/deserializer.

Figure 2:
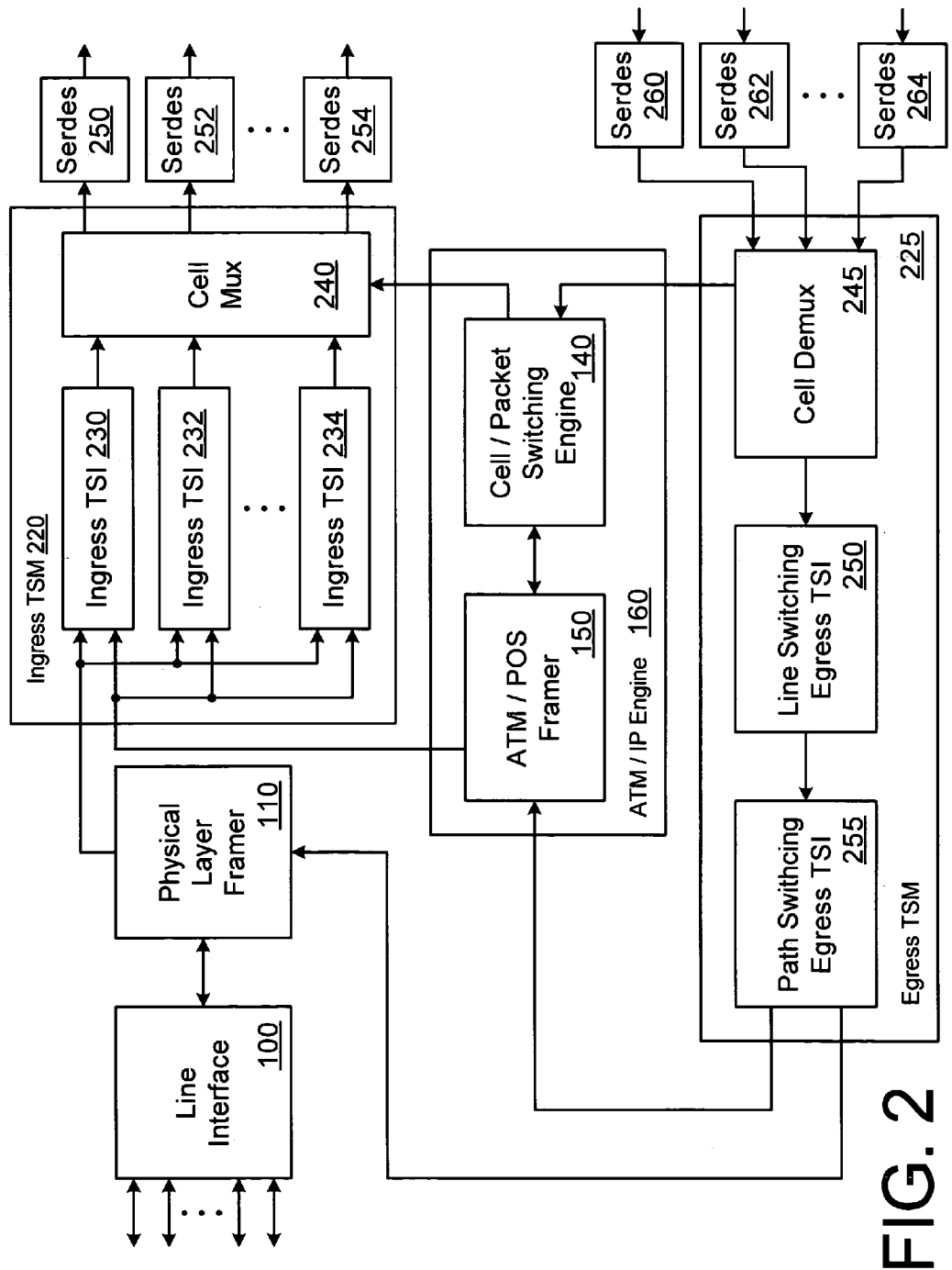
FIG. 2 is a conceptual block diagram of one embodiment of a time slot manager and associated components.

FIG. 2 is a conceptual block diagram of one embodiment of a time slot manager and associated components. TSM 120 of FIG. 1 is illustrated as two TSM blocks, one for ingress processing (220) and one for egress processing (225). In one embodiment, data flow through the components of FIG. 2 can be configured in a per STS-1 channel basis. As described in greater detail below, ingress and/or egress flow can include 48 or more STS-1 channels that can be either TDM traffic or ATM/IP traffic.

In one embodiment, ingress TSM 220 includes 20 ingress Time Slot Interchanges (TSIs); however any number of TSIs can be provided. The ingress TSIs (e.g., 230, 232, 234) are coupled to receive data from physical layer framer 110 (e.g., SONET framed data, ATM cells, IP packets). The ingress TSIs are also coupled to receive data from POS/ATM framer 150. In one embodiment, the ingress TSIs receive STS-1 formatted channels from one or more telecommunications lines via physical layer framer 110 and STS-1 formatted channels can be looped back via egress TSM 225 through POS/ATM framer 150.

The ingress TSIs perform time switching on the incoming channels. Time switching involves switching the order in which data is transmitted or the times at which the data is transmitted. The time switched channels output by the ingress TSIs are input to cell multiplexer (cell MUX) 240. In one embodiment, the ingress TSIs communicate data via fixed length cells whether or not the protocol used for the data uses fixed length cells. In other words, IP packets are communicated within the TSM and on the backplane using fixed length cells.

In one embodiment, cell multiplexer 240 receives fixed length cells from the ingress TSIs and demultiplexers the cells to the appropriate serializer/deserializer so that the cells can be communicated via a backplane link (not shown in FIG. 2). In one embodiment, the demultiplexing is based on cell header information for the respective cells. The cell header information can include, for example, a destination card identifier, an interface identifier, a channel identifier, etc.

The cells output by cell multiplexer 240 are input to serializer/deserializers (e.g., SERDES 250, SERDES 252, SERDES 254), which are coupled to the respective outputs of cell multiplexer 240. The serializer/deserializers convert the incoming cells to serial streams of data to be transported via a backplane.

On the egress side, cell demultiplexer (CELL DEMUX) 245 receives cell and TDM data from serializer/deserializers (e.g., SERDES 260, SERDES 262, SERDES 264) coupled to the backplane. The serializer/deserializers receive data from corresponding serializer/deserializers on another card that is coupled to the backplane. The serializer/deserializers convert serial data to cell data.

In one embodiment, line switching egress TSI 250 receives up to 1056 STS-1 channels from cell demultiplexer 245. Of the 1056 STS-1 channels, up to 96 are selected by line switching egress TSI 250. SONET line switching is provided by line switching egress TSI 250.

Path switching egress TSI 255 receives up to 96 STS-1 channels from line switching egress TSI 250 and outputs up to 48 STS-1 channels. In one embodiment, path switching egress TSI 250 presents up to 48 STS-1 channels to physical layer framer 110 and up to 48 STS-1 channels to POS/ATM framer 150. STS-1 level path switching is provide by path switching egress TSI 255. The channels sent from path switching egress TSI 255 to physical layer framer 110 are transmitted over telecommunications lines coupled to line interface 110.

With respect to ingress TDM traffic flows from an external device to the backplane, which is left to right in FIG. 2, Egress traffic flows from the backplane to the external device, which is right to left in FIG. 2. Line interface 100 and physical layer framer 110 provide STS-1 channels carrying TDM data to ingress TSM 220. Ingress TSM 220 routes the channels to the appropriate serializer/deserializer for transmission across the backplane to a target card. Traffic that is destined for the same card (e.g., to a different STS-1 channel to a different physical interface on the same card) are looped back by ingress TSM 220 to egress TSM 225 via the backplane.

STS-1 channels from the backplane are processed by egress TSM 225 for line switching as well as path switching. Up to 48 STS-1 channels are selected and sent to physical layer framer 110 for transmission to line interface 100.

The components of FIG. 2 can also be used for processing cell/packet data flow. In the ingress direction, STS-1 channels from line interface 100 and physical layer framer 110 and cells/packets are passed through ingress TSM 220 to the SERDES link destined for the same card. In other words, the incoming cells/packets are looped back via the backplane.

Egress TSM 225 sends the cells/packets looped back via the backplane to POS/ATM framer 150. In an ATM application, ATM cells are carried within a 57-byte backplane cell. A 4-byte header is added to carry information for scheduling.

In a POS application, IP packets are switched across the backplane by variable-length cells. In one embodiment, the variable length cells can be from 40 to 127 bytes. The backplane super cells from the ingress switching carry the destination card and port information in the header, which is used by cell demultiplexer 240 in ingress TSM 220 to route the cells to the various SERDES links.

The looped back cells/packets are sent from POS/ATM framer 150 to cell MUX 240 through cell/packet switching engine 140. Cell MUX 240 routes the cell/packets to the appropriate SERDES for forwarding to a target card across the backplane.

In the egress direction, cells or packets are received from the backplane by SERDES components and sent to cell demultiplexer 245, which routes the cells to egress line switching egress TSI 250 and to the ATM/IP engine for egress switching and processing. After egress switching and processing, ATM cells or IP packets, based on the header information that identifies the egress logical port (or STS-1 channel), are inserted into the appropriate STS-1 channel by the POS/ATM framer.

In one embodiment, the STS-1 channels from the POS/ATM framer are looped through the SERDES link destined to the same card to the egress TSM 225 before being sent to the physical layer framer 110 and line interface 100 for transmission. In one embodiment, for every cell or IP packet transmitted, a feedback signal is sent to the source interface card for scheduling purposes. For example, the feedback information can be carried in a cell header.

Figure 3:
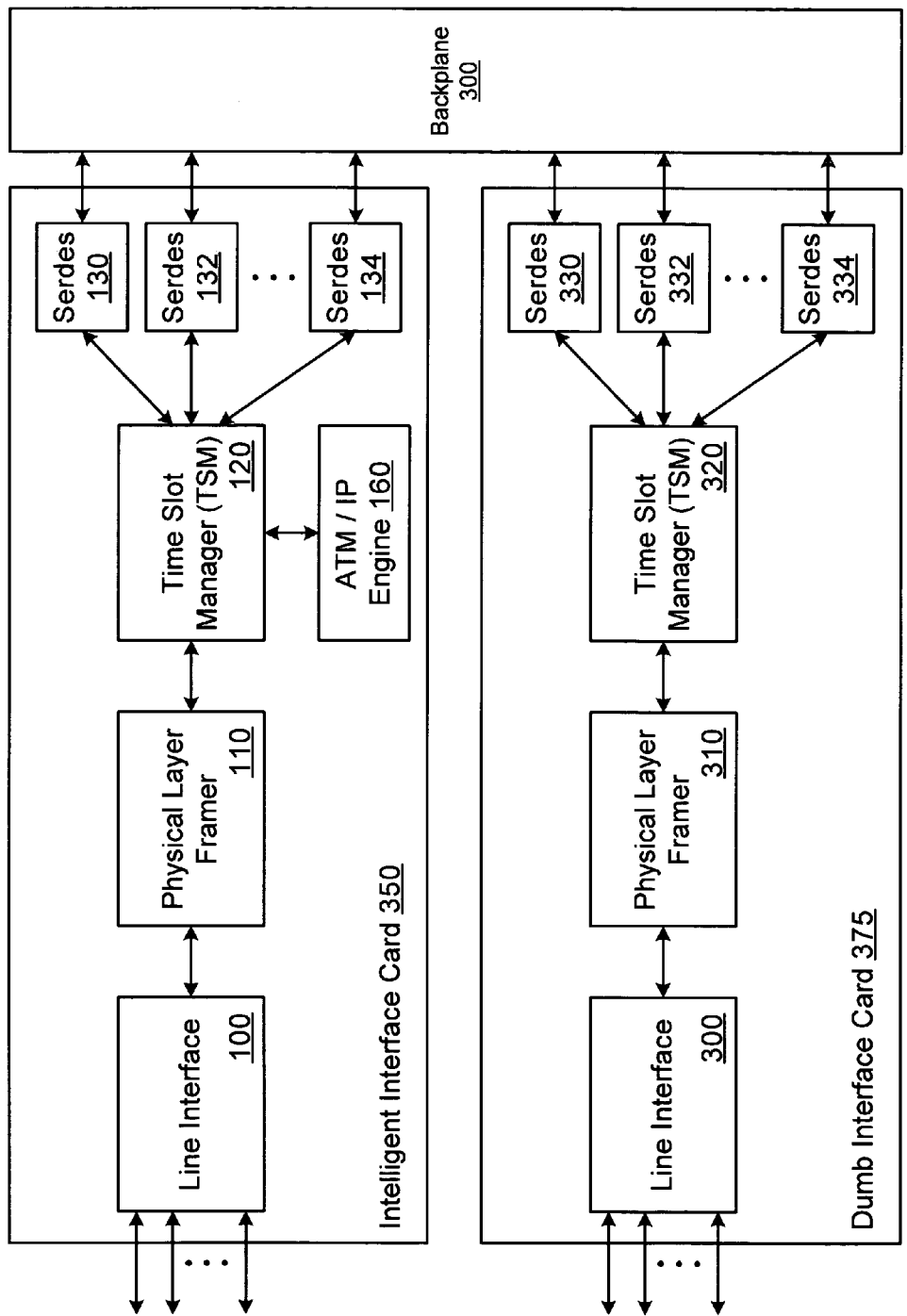
FIG. 3 is a block diagram of a dumb card accessing an ATM/IP engine on an intelligent card.

FIG. 3 is a block diagram of a dumb card accessing an ATM/IP engine on an intelligent card. In one embodiment, traffic carried on a dumb interface card can be processed by an ATM or IP layer on another interface card having an ATM/IP engine. Unused STS-1 channels on the ATM/POS framer of the intelligent card are used for channels from the dumb card.

For example, on an OC-48 card coupled to a 48 UPSR or BLSR ring, only 24 STS-1 channels are used. The unused 24 STS-1 channels can be used to process channels from a dumb interface card. A channel of data (e.g., STS-1, STS-3, STS-12) is received by line interface 300 of dumb interface card 375. The channel is processed by physical layer framer 310 and TSM 320 as described above. TSM 320 routes the data to one of one of the serializer/deserializers (SERDES 330, 332, 334) of dumb interface card 375, which transmits the data over backplane 390 to one of the serializer/deserializers (SERDES 130, 132, 134) on intelligent interface card 350.

The data received by intelligent interface card 350 from dumb interface card is routed by TSM 120 to ATM/IP engine 160 for processing in the manner described above. TSM 120 receives the processed data from ATM/IP engine 160 and routes the processed data to the appropriate serializer/deserializer for transmission over backplane 390 to dumb interface card 375.

The processed data received by a serializer/deserializer of dumb interface card 325 from intelligent interface card 350 is looped back through TSM 320 to one of the serializer/deserializers of dumb interface card 375. The data is then transmitted via backplane 390 to a target interface card (not shown in FIG. 3).

Figure 4:
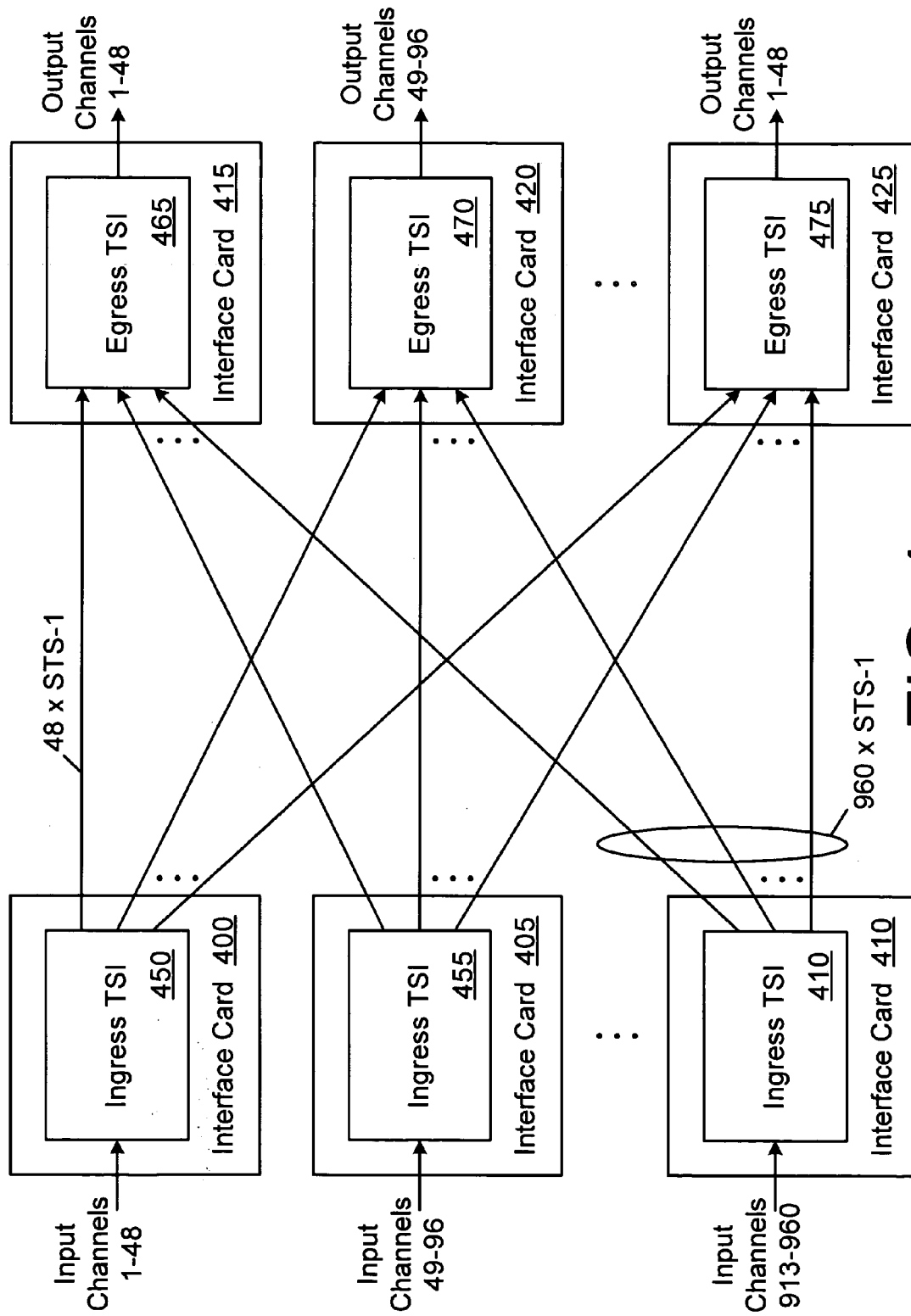
FIG. 4 illustrates one embodiment of a set of line interface cards interconnected via a backplane to provide a time slot interchange.

FIG. 4 illustrates one embodiment of a set of line interface cards interconnected via a backplane to provide a time slot interchange. The example of FIG. 4 is a 960×960 STS-1 level time slot interchange; however, any size interchange can be provided in a similar manner.

In one embodiment, the switches of FIG. 1 include multiple cards that are interconnected by a switching fabric. In one embodiment, the cards have both an ingress data path and an egress data path. The ingress data path is used to receive data from a network and transmit the data to an appropriate card within the switch. The egress data path is used to receive data from the switching fabric and transmit the data across the network.

Each ingress interface card (e.g., 400, 405, 410) includes an ingress TSI (e.g., 450, 455, 460) that receives data input channels from an external source. In one embodiment, the data is TDM data; however, data can be in any format, for example, IP packets or ATM cells. The ingress TSIs are coupled to ingress serializer/deserializers. In one embodiment, each ingress card has a serializer/deserializer for each egress card to which the ingress card is coupled.

Each egress interface card (e.g., 415, 420, 425) includes a serializer/deserializer to for each ingress interface card to which the egress interface card is coupled. The serializer/deserializer of the egress interface card are coupled to an egress TSI (e.g., 465, 470, 475). The egress serializer/deserializers are coupled to an egress TSI that outputs data to a device external to the egress card.

Because each ingress card is coupled to each egress card, the interconnection between the ingress cards and the egress cards has $n^2$ connections where n is the number of ingress/egress cards. Thus, the interconnection is referred to as an "$n^2$ mesh," or an "$n^2$ switching fabric." The mesh is described in greater detail in U.S. patent application Ser. No. 09/746,212, entitled "A FULL MESH INTERCONNECT BACKPLANE ARCHITECTURE," filed Dec. 22, 2000, which is assigned to the corporate assignee of the present application and incorporated by reference.

In one embodiment, each backplane link between an ingress interface card and an egress interface card can carry up to 48 STS-1 channels. As mentioned above, in one embodiment, each interface card includes 20 ingress TSIs. Thus, the bandwidth provided by a 20 TSI interface card is 960 STS-1 channels. By changing the number of TSIs and the number of interconnections across the backplane, the number of STS-1 channels supported can be modified. A protocol for use in communicating over the mesh is described in greater detail in U.S. patent application Ser. No. 09/745,982, entitled "A BACKPLANE PROTOCOL," filed Dec. 22, 2000, which is assigned to the corporate assignee of the present invention and incorporated by reference. In one embodiment, traffic crosses the mesh, or switching fabric, in an asynchronous manner in that no central clock signal drives data across the mesh. Data is transmitted by the ingress cards without reference to a bush or mesh clock or frame synchronization signal. entitled "A BACKPLANE PROTOCOL," filed Dec. 22, 2000, which is assigned to the corporate assignee of the present invention and incorporated by reference.

In one embodiment, in the ingress direction, the ingress TSI of each ingress interface card routes the 48 channels received by the ingress interface card to the appropriate serializer/deserializer. The serializer/deserializers transmit data across the backplane to the appropriate egress interface card. In the egress direction each egress interface card receives 1056 channels (960 from the backplane and 96 from loopback). The egress TSI selects and routes 48 of the channels to an external device.

In the following example of routing channels with a distributed TSI, the system consists of two OC-3 interface cards supporting a total of 6 STS-1 channels. The three STS-1 channels of interface card 1 are channel 1, channel 2 and channel 3. The three STS-1 channels of interface card 2 are channel 4, channel 5 and channel 6. The TSI functions to be implemented are:

TABLE 1

| TSI function | |
| --- | --- |
| Ingress STS-1 channel | Egress STS-1 channel |
| 1 | 5 |
| 2 | 6 |
| 3 | 1 |
| 4 | 2 |
| 5 | 4 |
| 6 | 3 |

To fulfill the TSI function of Table 1, the ingress TSI and egress TSI tables for cards 1 and 2 are configured as described in Tables 2 and 3, and Tables 4 and 5, respectively.

TABLE 2

| Ingress TSI Table for Card 1 | |
| --- | --- |
| Ingress STS channel | Backplane/loopback channel |
| 1 | 5 |
| 2 | 6 |
| 3 | 1 |
| — | — |
| — | — |
| — | — |

TABLE 3

| Egress TSI Table for Card 1 | |
| --- | --- |
| Backplane/loopback channel | Egress STS channel |
| 1 | — |
| 2 | 1 |
| 3 | 3 |
| 4 | 2 |
| 5 | — |
| 6 | — |

TABLE 4

| Ingress TSI Table for Card 2 | |
| --- | --- |
| Ingress STS channel | Backplane/loopback channel |
| — | — |
| — | — |
| — | — |
| 4 | 2 |
| 5 | 4 |
| 6 | 3 |

TABLE 5

| Egress TSI Table for Card 2 | |
| --- | --- |
| Backplane/loopback channel | Egress STS channel |
| 1 | 6 |
| 2 | — |
| 3 | — |
| 4 | — |
| 5 | 4 |
| 6 | 5 |

Thus, each ingress TSI and egress TSI has an associated table or tables that indicate the routing of channels between the ingress side and the egress side. Other types of data, for example, ATM or IP data can be routed between the ingress TSIs and egress TSIs in a similar manner except that the data is routed through the ATM/IP engine as described above.

Figure 5:
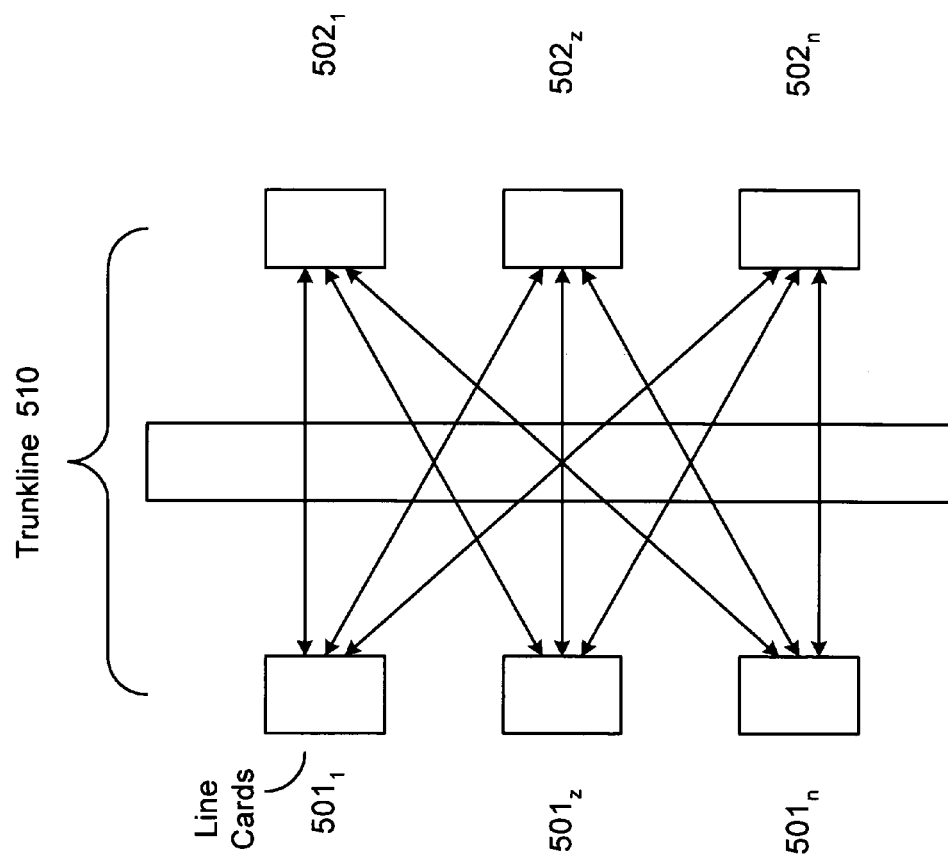
FIG. 5 illustrates one embodiment of a network.

A network box or system, that implements the functionality of one or more of a switch, ADM, crossconnect (e.g., TDM) is described. In one embodiment, the network box utilizes a full mesh backplane that provides a serial link interconnect between each line card in the system with every other line card in the system. FIG. 5 illustrates one embodiment of a network box. Referring to FIG. 5, line cards $501_1$–$501_N$ are shown coupled to line cards $502_1$–$502_N$ via backplane 510. Backplane 510 comprises a full mesh interconnect in which each of line cards $501$–$501_N$ has a dedicated connection to each of line cards $502$–$502_N$. Note that line cards $501_1$–$501_N$ and line cards $502_1$–$502_N$ are shown arranged with respect to both sides of backplane 510; however, such cards are typically positioned in a cabinet side by side connected to backplane 510 along the same edge of each card.

A backplane protocol is used by transceivers on the line cards to transport data and control information between each other over the full mesh interconnect. The backplane protocol described herein accommodates both TDM and block, or packet, data traffic types so that the fully meshed interconnect operates as a packet and TDM switch fabric using the same set of high speed links.

In one embodiment, the protocol described provides a mechanism whereby control channels between elements within a switch can be implemented in an integrated manner within the same link used for data. The presence of these control channels combined with the fully meshed interconnect allows for the implementation of a distributed switch architecture.

In one embodiment, the protocol allows for variable sized packets on the backplane links. This allows the links to maintain full throughput regardless of the arriving packet sizes and under-utilization if the backplane link will be avoided. In one embodiment, the protocol also allows the backplane links to be clocked independently from any of the timing references used on the interfaces out of the network box. This is accomplished by transferring data on the link that is marked as "don't care". This data is referred to herein as stuffing. The receiver throws away, or ignores, that data, and thus, the receiver in avoiding processing that data can use that time to accommodate for differences in the timing references of the transmitter on one card and the receiver on the other.

In one embodiment, the protocol described herein allows for integrating incremented protocol upgrades. New line cards may utilize new versions of the backplane protocol. These new cards may be designed to support older versions of the protocol as well. In one embodiment, backplane links to/from older cards use an older version of the protocol, while links to/from new cards use the new version. In this fashion, new types of cards can be introduced into network boxes without having to remove older cards.

Figure 6:
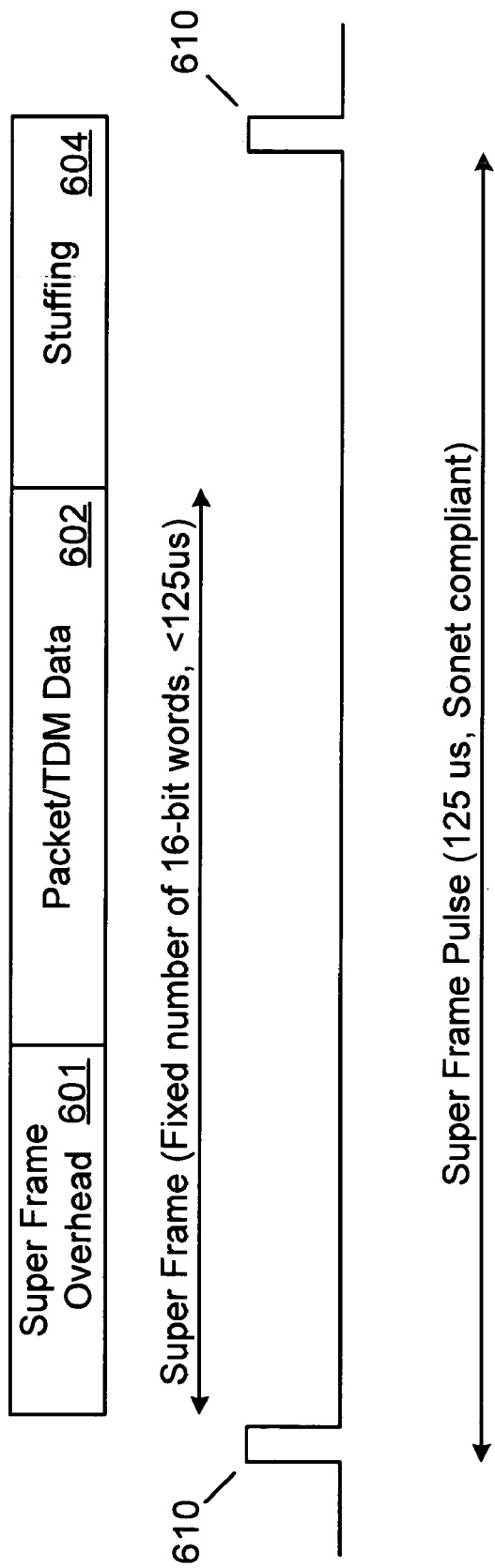
FIG. 6 illustrates one embodiment of a super frame data structure to send data over backplane links.

FIG. 6 illustrates one embodiment of a frame data structure to send data over backplane links. Referring to FIG. 6, the data structure comprises a frame overhead 601, packet/TDM data 602, and stuffing 604. In one embodiment, each of frame overhead 601 and packet/TDM data 602 of the frame comprises a fixed number of 16-bit words. A line card splits the data transported into 16-bit words and collects a number of such words into the frame structure.

Stuffing 604 follows the frame to accommodate for frequency differences between the system frame pulse and the backplane reference clock as well as for frequency differences between the backplane reference clocks of two cards if not the same.

In one embodiment, the frame is sent over the backplane links as a 125us structure with stuffing 604 at the end. The super frame and stuffing 604 have a duration of a system frame pulse. In one embodiment, transmission of the packet started with a system wide 8kHz SONET compliant pulse 610. That is, frame pulse 610 is derived from a SONET compliant clock.

In one embodiment, the super frame overhead has the following functions: framing synchronization; bit/byte/word synchronization; checksum for link performance monitoring; provide packet pointer (start of new packet); data channels for card-to-card communication. In another embodiment, the super frame overhead also functions to distribute TDM/cell allocation information.

Figure 7:
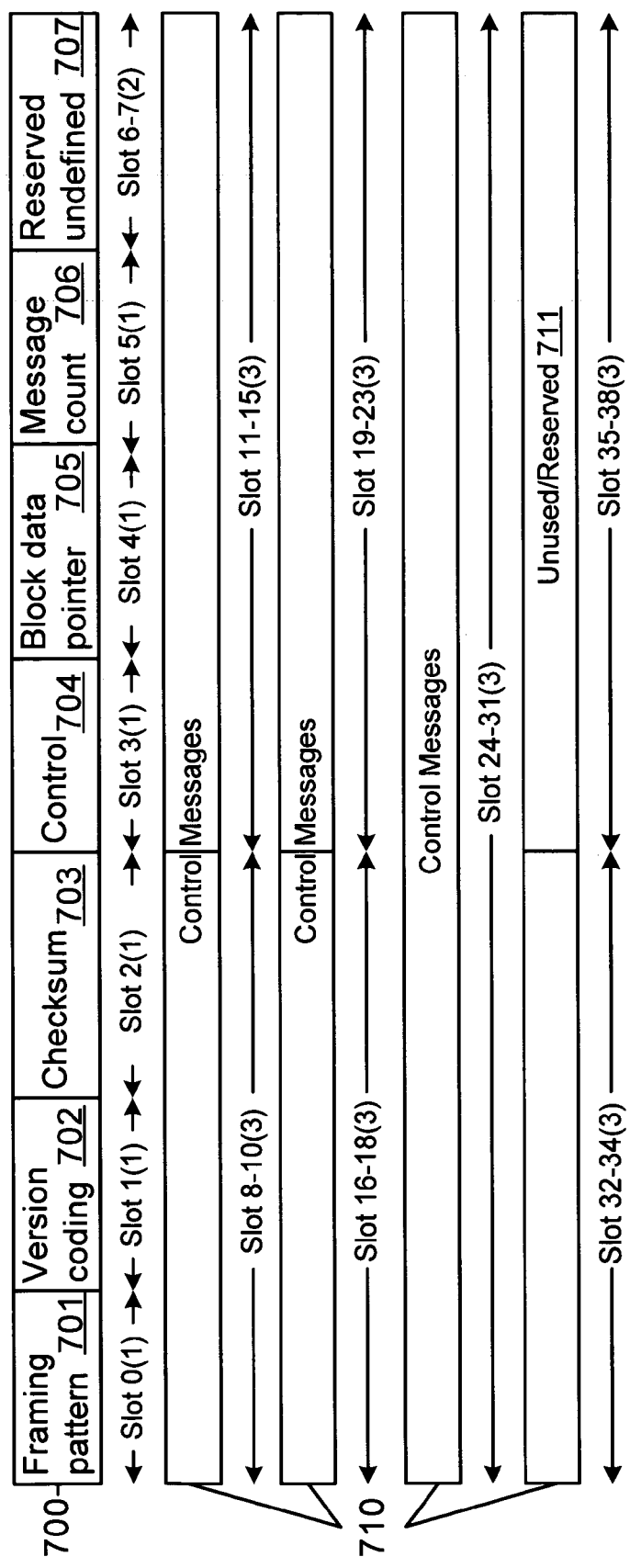
FIG. 7 illustrates one embodiment of the overhead portion of a super frame including control messages.

FIG. 7 illustrates one embodiment of the overhead of the frame of FIG. 6. Referring to FIG. 7, frame 700 includes framing pattern slot 701, version/coding slot 702, checksum slot 703, control slot 704, block data pointer slot 704, message count slot 706, and a reserve/undefined slot 707, followed by a number of slots for control messages 710 and a number of slots 711 that are reserved or unused.

The information in framing pattern slot 701 is used by the receiver on the line card to locate the start of the frame and to align the bytes and/or words. In one embodiment, the frame is started a fixed delay after a system pulse (e.g., 8 KHz). Therefore, the receiver knows approximately when to look for the pattern. Version/coding slot 702 contains version control information. In one embodiment, version control information enables changes in the frame structure with respect to backward compatibility. For example, newer versions always support older formats. Once the version information is received by a receiver, the receiver may use the proper coding or scrambling that is associated with that version.

Checksum slot 703 contains the check sum that is used for performance monitoring of the link.

Control slot 704 contains control related information. In one embodiment, control slot 704 provides locations for TDM/block data allocation bits that allow for performing synchronization procedures when changing the allocation between TDM and packet data on a backplane link. In one embodiment, the new allocation is filled in by both egress and ingress cards before writing an update bit on the ingress card. When the update bit is written on the ingress card, the next frame uses the new allocation and a synchronization message is sent.

Block data pointer slot 705 contains a pointer to the start of a new block data in the frame. This pointer is included because it can not be assumed that the last block data in the last super frame was transmitted in full. By having the pointer, the start of a first new block data in each frame can be located.

Message count slot 706 contains information indicative of the number of control messages that are valid in the current super frame.

The reserve/undefined slots 707 are currently designated for future use; however, in another embodiment they may be used for a variety of functions. The same is true of the unused/reserved slots 711.

Control message slots 710 provide transport for low latency control channels for controls, such as, but not limited to, flow control, protection switching control data, etc.

The second portion of the frame is for transporting the packets and TDM data. In one embodiment, the packet/TDM portion consists of a number of channels, each carrying a STS-1 rate signal (approximately 52 Ivlbits/s). The number of channels depends on the speed used for the backplane link (i.e., link speed). For instance, a 3.125 Gbits/s link speed gives approximately 60 channels, or slots. For 60 channels, each of the channels can be allocated to either TDM data, packet data, or control data. In one embodiment, there are 6 channels dedicated to packet data, 6 channels dedicated to packet control data and 48 channels dedicated to packet and/or TDM data in each frame. Other allocations are possible, including those due to having less than 60 channels.

Figure 8:
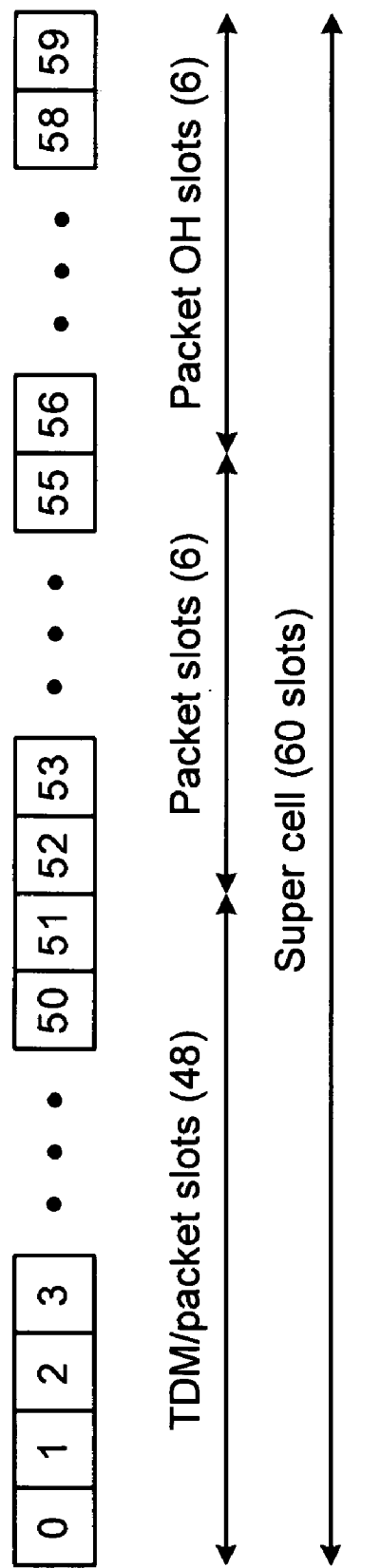
FIG. 8 illustrates an example of a super cell structure.
Figure 9:
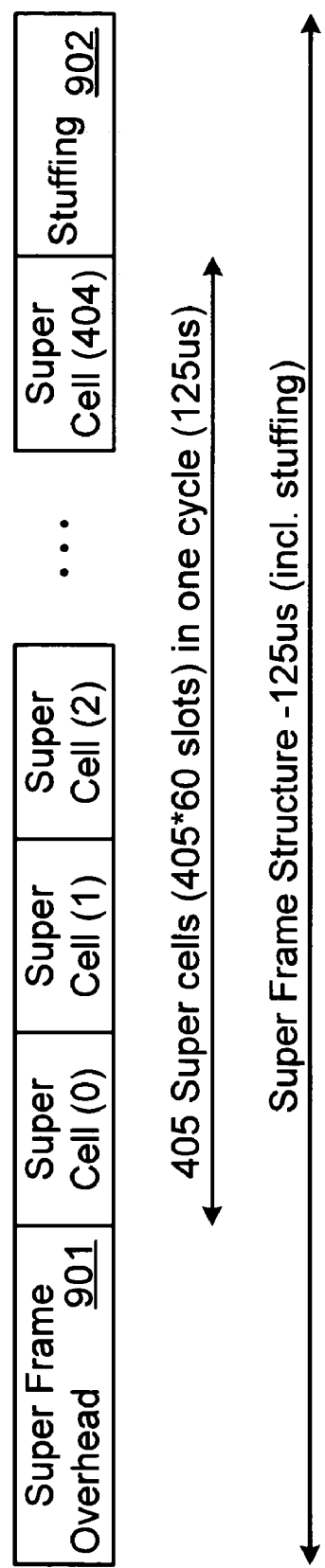
FIG. 9 illustrates one embodiment of super cell packing.

In one embodiment, to keep the latency low, the channels are interleaved on a 16-bit level, with 16-bits from each channel forming a "s uper cell". FIG. 8 illustrates an example of a super cell structure. Referring to FIG. 8, supercell 800 comprises 48 slots for TDM/packet data, 6 slots dedicated to packet data, and 6 slots dedicated for overhead. In one embodiment, each slot not allocated to TDM or overhead is allocated to packet data. In one embodiment, there are 805 supercells in each frame structure, or in one cyde. FIG. 9 illustrates one embodiment of super cell packing. Referring to FIG. 9, frame overhead 901 is followed by supercells 0–404, which is followed by stuffing 902. The supercells, supercell(0)-supercell (404), are placed one after another to fill a frame. In one embodiment, the super cells are put one after another until 810 bytes are put in each channel (to match the STS-1 rate).

Although there are 405 super cells, the channels may change to compensate for changes in the link speed over the interconnect. In other words, the number of channels may change while the number of super cells remains the same. Thus, for any one channel the latency and throughput stay the same regardless of the number of channels.

The stuffing in the end of the super frame structure allows for adjusting the super frame rate to match the TDM data rate, i.e., 125 us period, over long periods. The stuffing words also make it possible to terminate the received clock domain very quickly, which is critical for an FPGA implementation. The stuffing accounts for slight variations in the clocks between the transmit and receive domains. This is because the stuffing is not received for processing. Therefore, if the processing rate on the receive card is slower than the data is being sent, the fact that the stuffing is not processed allows time for a slower receive card to process the data without incurring errors due to the small amount of difference in the clock speeds in the transmit and receive domains. In essence, this enables the format to be independent of the clock.

In one embodiment, the first word of the overhead is selected so that a single bit error in the stuffing does not result in the two being the same. Therefore, if an error occurs in the stuffing, a line card will not confuse the stuffing with the start of a super frame.

Figure 10:
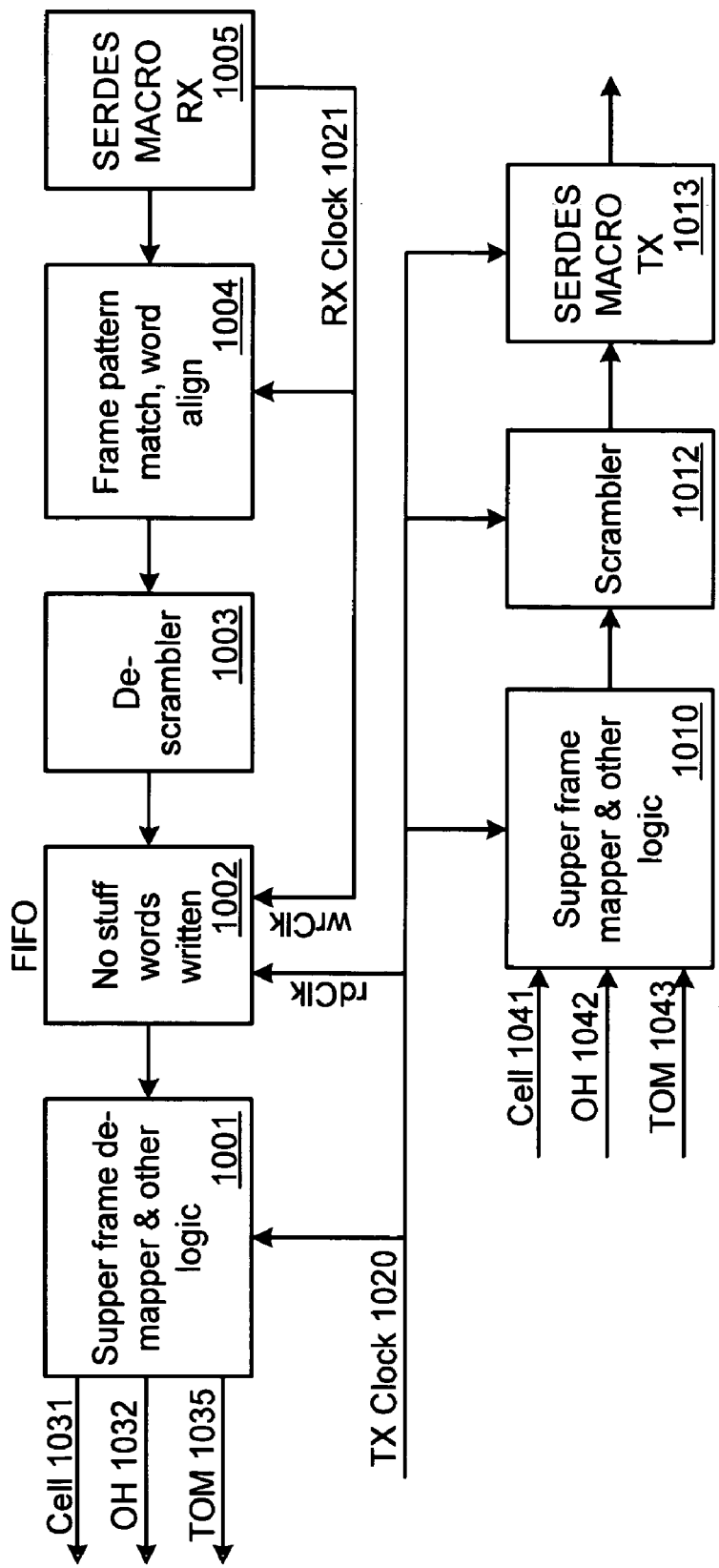
FIG. 10 illustrates early termination of the received clock domain.

FIG. 10 is a block diagram of one embodiment of an interface on a line card to send and receive information. Referring to FIG. 10, receiver 1005 receives frames in the form of a bit stream from another line card via a link on the backplane. The data is clocked-in using a receiver (Rx) clock 1021. The clocked-in data is forwarded to frame pattern matching block 1004 that performs frame pattern matching and word alignment on the received bit stream in a manner well-known in the art. After frame pattern matching and word alignment, descrambler 1003 performs descrambling in a manner well-known in the art, and stores the descrambled data into FIFO 1002 using Rx clock 1021 as a write clock. In one embodiment, descrambler 1003 performs 2-stage synchronous descrambling, including performing scrambling according to SONET scrambling $1+x^6+x^7$ and performing the scrambling according to the following equation: $(1+x^{43})$. No stuffing words are written into FIFO 1002. Demapper 1001 reads data from FIFO 1002 according to a read clock and performs a demapping (e.g., sorting) operation to produce a cell data stream 1031, an overhead data stream 1032, and a TDM data stream 1033. In one embodiment, the read clock comprises the transmit (Tx) clock 1020 used for sending frames and is the clock for demapper 1001.

For transmission, mapper 1011 receives a cell data stream 1041, an overhead stream 1042 and a TDM data stream 1043 and combines them into a single data stream. Scrambler 1012 receives the stream of frames and scrambles them. In one embodiment, scrambler 1012 performs a 2-stage frame synchronous scrambling. The scrambled frames are sent and transmitted by transmitter 1013. Each of frame mapper 1011, scrambler 1012, and transmitter 1013 are coupled to receive, and operate based upon, at least in part, Tx clock 1020.

In one embodiment, the stuffing is done at a 16-bit word level resulting in jitter in the TDM data. However, this jitter will be removed after a buffer (coupled to the TDM output of a demapper) that takes the data into the "telecom" clock domain. By stuffing with 16-bits, the bit/byte/word alignment does not have to be redone after it is found.

Figure 11:
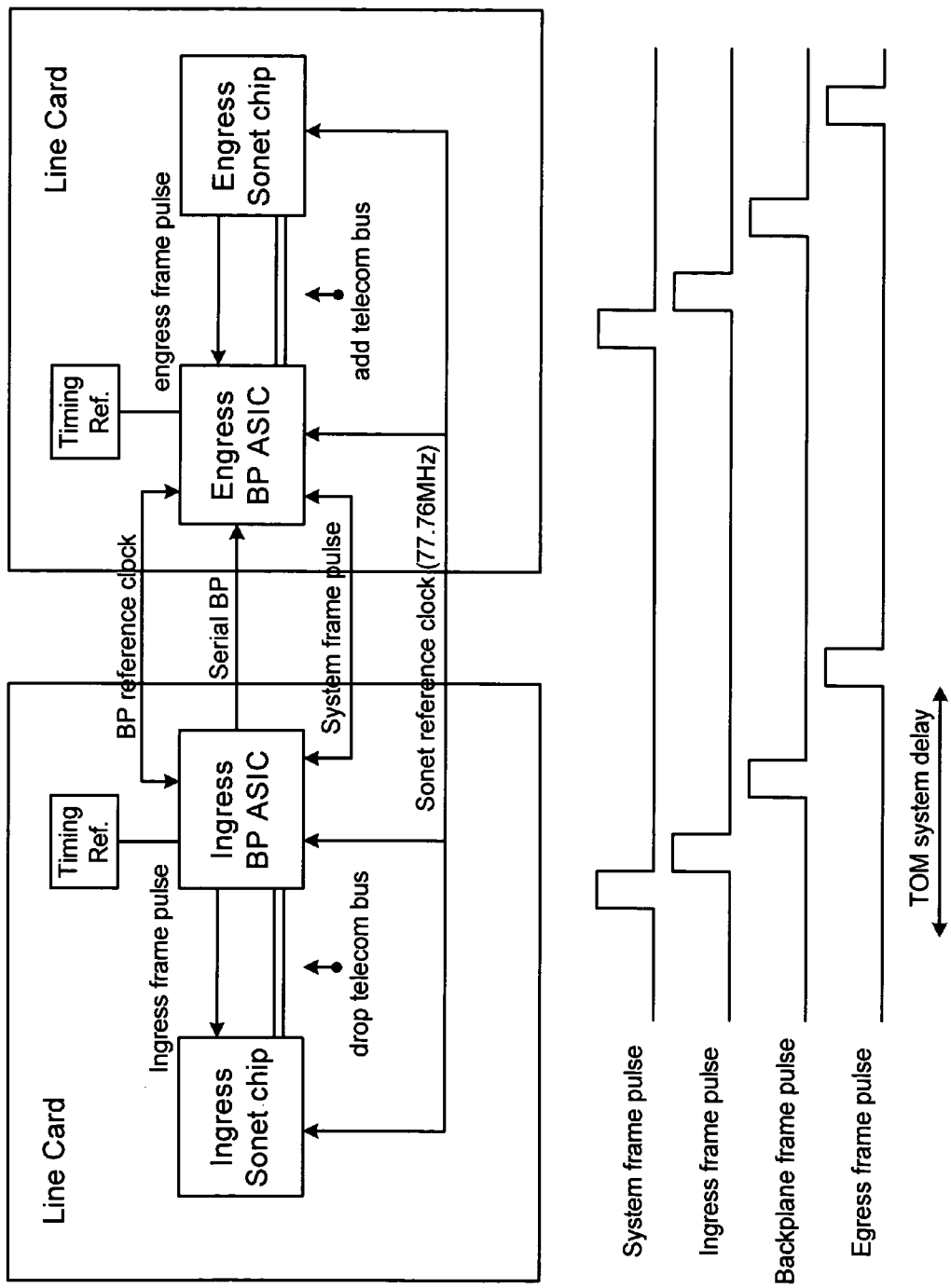
FIG. 11 illustrates two SONET chips connected via their telecommunications buses through the backplane.

FIG. 11 illustrates two SONET chips connected via their telecom buses through a backplane. For simplicity, data is shown only going in one direction. Therefore, reference to ingress and egress given in the following example are not indicative of the sole function of a device and may be switched when the data direction is revised.

Referring to FIG. 11, both backplane ASICs are coupled to receive the system frame pulse. This pulse is used both for super frame synchronization on the backplane and for the frame pulse indications to the SONET chips. As shown in FIG. 11, the first pulse to be generated (from the system frame pulse) is the ingress SONET frame pulse. This pulse causes SONET chip 1101 to output the start of the SONET frame (first byte after J0) on the drop telecom bus 1111. This data is put into small FIFOs (not shown) inside ASIC 1102. At the start of the backplane framing pulse, the super frame is sent out and, at the first TDM slot, data is read out from the TDM ingress FIFOs.

On the egress side, the backplane ASIC 1103 receives the start of the super frame and soon thereafter obtains TDM data. This data is again put into small FIFOs in ASIC 1103.

Some time after the backplane frame pulse, backplane ASIC 1103 generates an egress frame pulse to egress SONET chip 1104. At this time the TDM data is available in the egress FIFOs and can be placed on the add telecom bus 1112.

Ingress SONET chip 1101 adjusts and outputs the SPE pointers (as defined in SONET standard) according to the frame pulse. Egress SONET chip 1104 only needs the frame pulse marker and then performs "normal" SONET pointer processing.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A network switch comprising:
a backplane to carry data traffic of multiple types; and
a plurality of interface cards coupled to the backplane via multiple links, the interface cards coupled to receive multiple channels of network traffic from external sources, the plurality of interface cards to receive one or more channels of data according to a time division multiplexed (TDM) protocol and one or more channels of data according to a second protocol, the interface cards to route TDM traffic to one or more selected links based on a corresponding destination interface card for transmission over the backplane and to route traffic of the second protocol to one or more links to looped back to a source interface card via the backplane.

2. The network switch of claim 1 wherein the second protocol comprises a network traffic protocol.

3. The network switch of claim 2 wherein the second protocol comprises an asynchronous transfer mode (ATM) protocol.

4. The network switch of claim 2 wherein the second protocol comprises an internet protocol (IP).

5. The network switch of claim 1 wherein one or more of the interface cards receives electrical signals to communicate the network traffic.

6. The network switch of claim 5 wherein one or more of the interface cards receives optical signals to communicate the network traffic.

7. The network switch of claim 6 wherein the optical signals comprise SONET-framed data.

8. The network switch of claim 5 wherein one or more of the predetermined interface cards transmits electrical signals.

9. The network switch of claim 8 wherein one or more of the predetermined interface cards transmits optical signals.

10. The network switch of claim 9 wherein the optical signals comprise SONET-framed data.

11. The network switch of claim 1 wherein the interface cards convert the received data to an internal cell format for transmission over the backplane.

12. The network switch of claim 1 wherein each of the plurality of interface cards further comprises a plurality of buffers coupled with each of the other interface cards.

13. The network switch of claim 1 wherein the interface cards further to convert data received according to the TDM protocol and the looped back data received according to the second protocol to the internal cell format and to route the channels of data for asynchronous transmission over the backplane using the single internal cell format to one or more predetermined interface cards coupled to the backplane within the network switch, wherein the cell format comprises one or more slots for TDM traffic, one or more slots for non-TDM traffic and one or more slots for overhead.

14. An interface card comprising:
a backplane interface with a plurality of links to transmit and receive data over a backplane;
a network interface to transmit and receive multiple channels of network traffic from external sources, the multiple channels of network traffic to include one or more channels of data according to a time division multiplexed (TDM) protocol and one or more channels of data according to a second protocol;
a time slot management circuit coupled between the backplane interface and the network interface, the time slot management circuit to route the channels of data over the backplane to one or more predetermined destinations, wherein TDM traffic is routed to one or more selected links based on a corresponding destination interface card for transmission over the backplane and traffic of the second protocol is routed to one or more links to be looped back to a source interface card via the backplane.

15. The interface card of claim 14 wherein the second protocol comprises a network traffic protocol.

16. The interface card of claim 15 wherein the second protocol comprises an asynchronous transfer mode (ATM) protocol.

17. The interface card of claim 15 wherein the second protocol comprises an internet protocol (IP).

18. The interface card of claim 14 wherein the network interface receives one or more channels of network traffic as electrical signals.

19. The interface card of claim 14 wherein the network interface receives one or more channels of network traffic as optical signals.

20. The interface card of claim 19 wherein the optical signals comprise SONET-framed data.

21. The interface card of claim 14 wherein the network interface circuit converts the received data to an internal cell format for transmission over the backplane.

22. The interface card of claim 14 further comprising conversion circuitry to convert the TDM data and the second protocol data to the internal cell format.

23. A method comprising:
receiving multiple channels of network traffic from external sources via a network interface of an interface card, wherein the multiple channels of network traffic to include one or more channels of data according to a time division multiplexed (TDM) protocol and one or more channels of data according to a second protocol;
routing the channels of data in the internal cell format via an asynchronous backplane connection to one or more predetermined destinations, wherein TDM traffic is routed to one or more selected links based on a corresponding destination interface card for transmission over the backplane and traffic of the second protocol is routed to one or more links to be looped back to a source interface card via the backplane.

24. The method of claim 23 wherein the second protocol comprises a network traffic protocol.

25. The method of claim 24 wherein the second protocol comprises an asynchronous transfer mode (ATM) protocol.

26. The method of claim 24 wherein the second protocol comprises an internet protocol (IP).

27. The method of claim 23 further comprising converting the data according to a time division multiplexed (TDM) protocol and the data according to a second protocol to an internal cell format for transmission over the backplane.

28. The method of claim 23 further comprising converting the TDM data and the second protocol data to an internal cell format, wherein the cell format comprises one or more slots for TDM traffic, one or more slots for non-TDM traffic and one or more slots for overhead.

29. An apparatus comprising:
means for receiving multiple channels of network traffic from external sources via a network interface of an interface card, wherein the multiple channels of network traffic to include one or more channels of data according to a time division multiplexed (TDM) protocol and one or more channels of data according to a second protocol;
means for routing the channels of data in the internal cell format via an asynchronous backplane connection to one or more predetermined destinations, wherein TDM traffic is routed to one or more selected links based on a corresponding destination interface card for transmission over the backplane and traffic of the second protocol is routed to one or more links to be looped back to a source interface card via the backplane.

30. The apparatus of claim 29 wherein the second protocol comprises a network traffic protocol.

31. The apparatus of claim 30 wherein the second protocol comprises an asynchronous transfer mode (ATM) protocol.

32. The apparatus of claim 30 wherein the second protocol comprises an internet protocol (IP).

33. The apparatus of claim 29 further comprising means for converting the data according to a time division multiplexed (TDM) protocol and the data according to a second protocol to an internal cell format for transmission over the backplane.

34. The apparatus of claim 29 further comprising means for converting the TDM data and the second protocol data to an internal cell format, wherein the cell format comprises one or more slots for TDM traffic, one or more slots for non-TDM traffic and one or more slots for overhead.

* * * * *